United States Patent [19]

Chen

[11] Patent Number: 5,445,734
[45] Date of Patent: Aug. 29, 1995

[54] WATER FILTER

[76] Inventor: Ching-Wen Chen, No. 249-14, Lane 39, Hou Chuang, Ho Hsing Village, Chung Pu Hsiang, Chia I Hsien,

[21] Appl. No.: 344,713

[22] Filed: Nov. 18, 1994

[51] Int. Cl.6 .................. B01D 27/08; B01D 35/31; B01D 35/30
[52] U.S. Cl. .................. 210/232; 210/444; 210/450
[58] Field of Search ............ 210/232, 282, 440, 443, 210/444, 450; 55/502

[56] References Cited

U.S. PATENT DOCUMENTS

| | | |
|---|---|---|
| 3,225,929 | 12/1965 | Sicard . |
| 3,228,529 | 1/1966 | Gillick, Jr. . |
| 3,241,679 | 3/1966 | Walter . |
| 3,282,434 | 11/1966 | Pall . |
| 3,920,553 | 11/1975 | Cilento . |
| 4,544,387 | 10/1985 | Agerlid . |
| 5,022,986 | 6/1991 | Lang . |
| 5,328,609 | 7/1994 | Magnusson . |
| 5,362,389 | 11/1994 | Hardison . |

FOREIGN PATENT DOCUMENTS 942575  11/1963  United Kingdom .

*Primary Examiner*—Thomas M. Lithgow
*Attorney, Agent, or Firm*—Varndell Legal Group

[57] ABSTRACT

A water filter including a packing ring to seal up the gap between the casing and the top cover, which packing ring having downward projecting strips fitted into respective notches on the casing to stop the packing ring against rotary motion relative to the casing, two water sealing devices respectively mounted on a water outlet pipe on the top cover and a stub tube on the casing and having respective flanges forced to engage two opposite ends of the filter element and to prevent unfiltered water from entering the longitudinal center through hole of the filter element.

2 Claims, 7 Drawing Sheets

5,445,734

WATER FILTER

BACKGROUND OF THE INVENTION

The present invention relates to water filters, and relates more particularly to such a water filter having sealing means that can effectively seal up the gap between the casing and the top cover of the water filter and prevent unfiltered water from enter the longitudinal center through hole of the filter element to mix with filtered clean water.

A variety of water filters have been disclosed, and have appeared on the market. FIGS. 1 and 2 show a water filter according to the prior art, which is generally comprised of a cylindrical casing having an inner thread around the top opening, a filter element received in the cylindrical casing, a top cover having an outer thread threaded into the inner thread of the cylindrical casing to hold down the filter element, and a packing ring sealed between the top cover and the cylindrical casing. The filter element has a longitudinal center through hole and two annular grooves on two opposite ends thereof. The cylindrical casing has a stub tube on the inside at the bottom inserted into the bottom end of the longitudinal center through hole of the filter element, and an annular flange fitted into the annular groove on the bottom end of the filter element. The top cover has a water outlet pipe fitted into the top end of the longitudinal center through hole of the filter element, and an annular flange fitted into the annular groove on the top end of the filter element. This structure of water filter is still not satisfactory in function because the packing ring will be twisted to deform, when the top cover is threaded into the inner thread of the cylindrical casing. Frequently deforming the packing ring will shorten the service life of the packing ring and affect its performance. Furthermore, because the annular flanges of the top cover and the cylindrical casing are of rigid structure, they deform the two opposite ends of the filter element when installed. When the filter element is installed in the cylindrical casing again after every washing process, the annular flanges of the top cover and the cylindrical casing must be accurately stopped at the dents on the two opposite ends of the filter element which was formed by the squeezing of the annular flanges, or water leakage will happen.

FIGS. 3 and 4 show another structure of water filter designed to eliminate the aforesaid drawbacks, in which the packing ring has a downward annular flange fitted into an annular groove around the inside wall of the cylindrical casing; two water sealing ring respectively mounted within an annular groove on the bottom wall of the top cover and an annular groove on the bottom wall of the cylindrical casing and sealed between the two opposite ends of the filter element and the bottom walls the top cover and cylindrical casing. The drawback of this structure of water filter is its complicated assembly process.

SUMMARY OF THE INVENTION

The present invention has been accomplished under the circumstances in view. According to one aspect of the present invention, the packing ring which seals up the gap between the cylindrical casing and the top cover has a plurality of downward projecting strips fitted into respective notches on the cylindrical casing, and therefore the packing ring will not be twisted when the top cover is fastened to the cylindrical casing. According to another aspect of the present invention, two water sealing devices are respectively mounted on the water outlet pipe on the top cover and the stub tube on the cylindrical casing. The water sealing devices have a respective outward flange stopped between the filter element and the top cover or cylindrical casing, and a respective annular flange raised from the respective outward flange and engaging one end of the filter element to prevent unfiltered water from mixing with filtered water.

DETAILED DESCRIPTION OF THE PREFERRED EMBODIMENT

Figure 1:
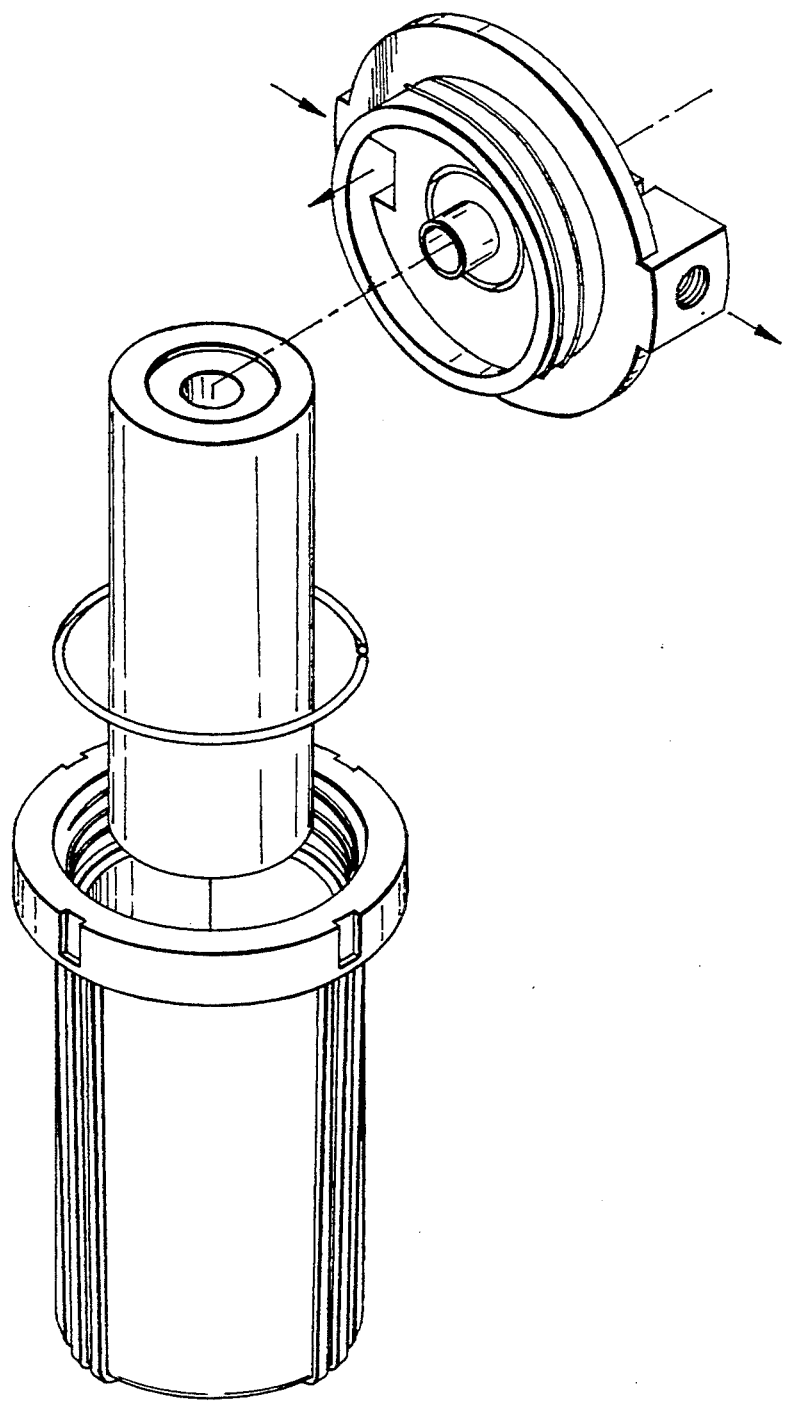
FIG. 1 is an exploded view of a water filter according to the prior art.
Figure 2:
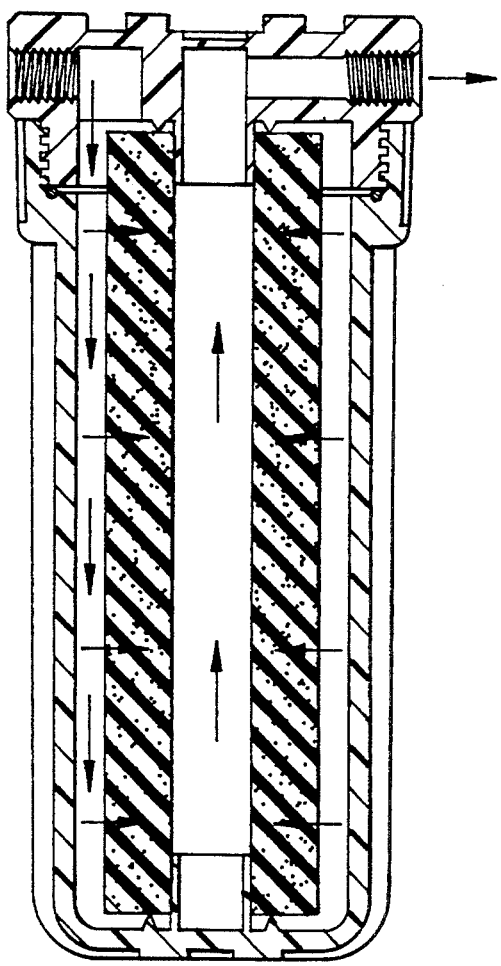
FIG. 2 is an assembly view in section of the water filter shown in FIG. 1.
Figure 3:
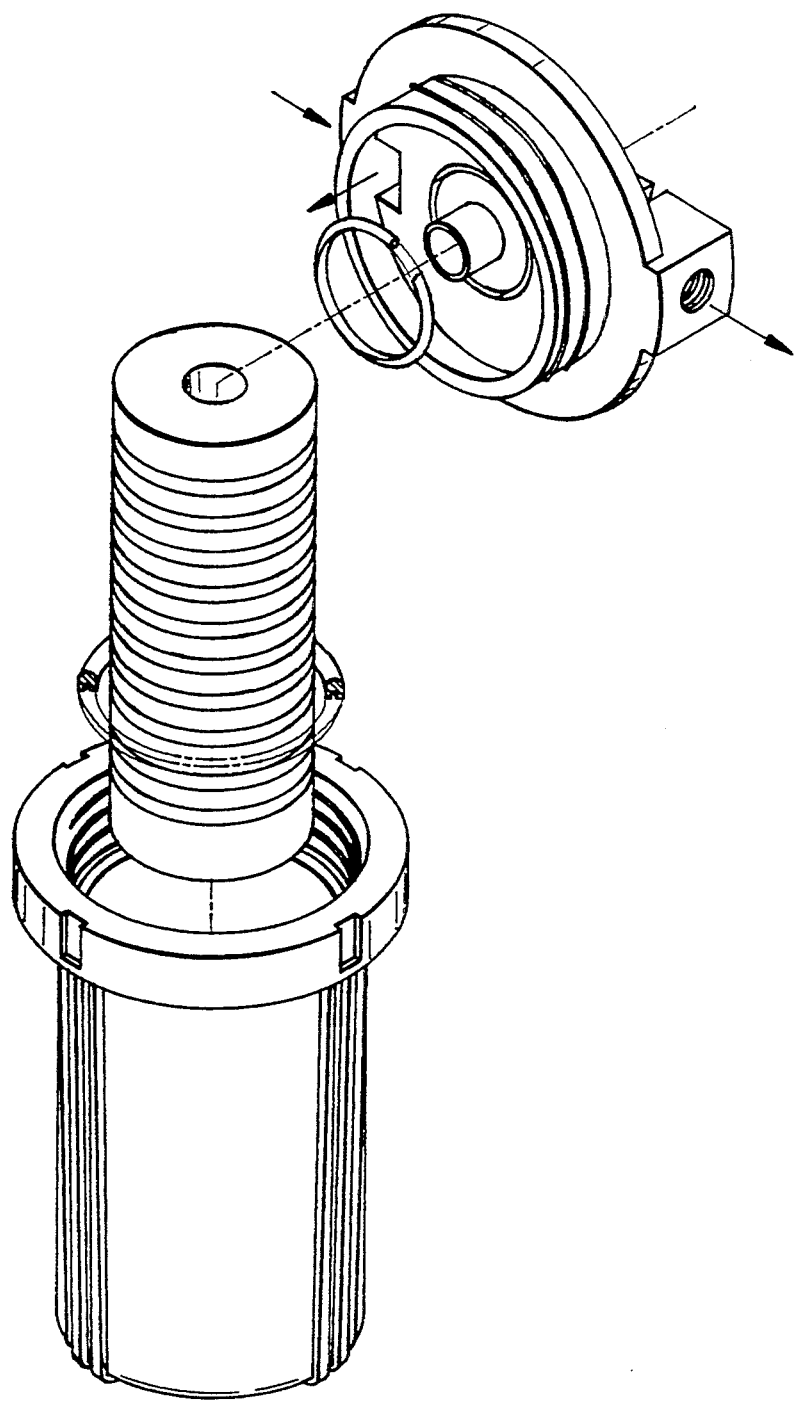
FIG. 3 is an exploded view of another structure of water filter according to the prior art.
Figure 4:
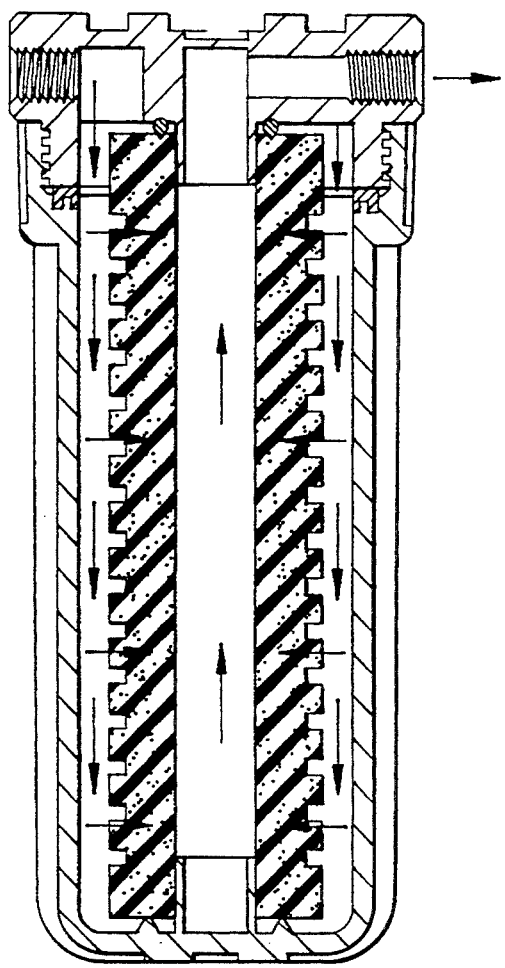
FIG. 4 is an assembly view in section of the water filter shown in FIG. 3.
Figure 5:
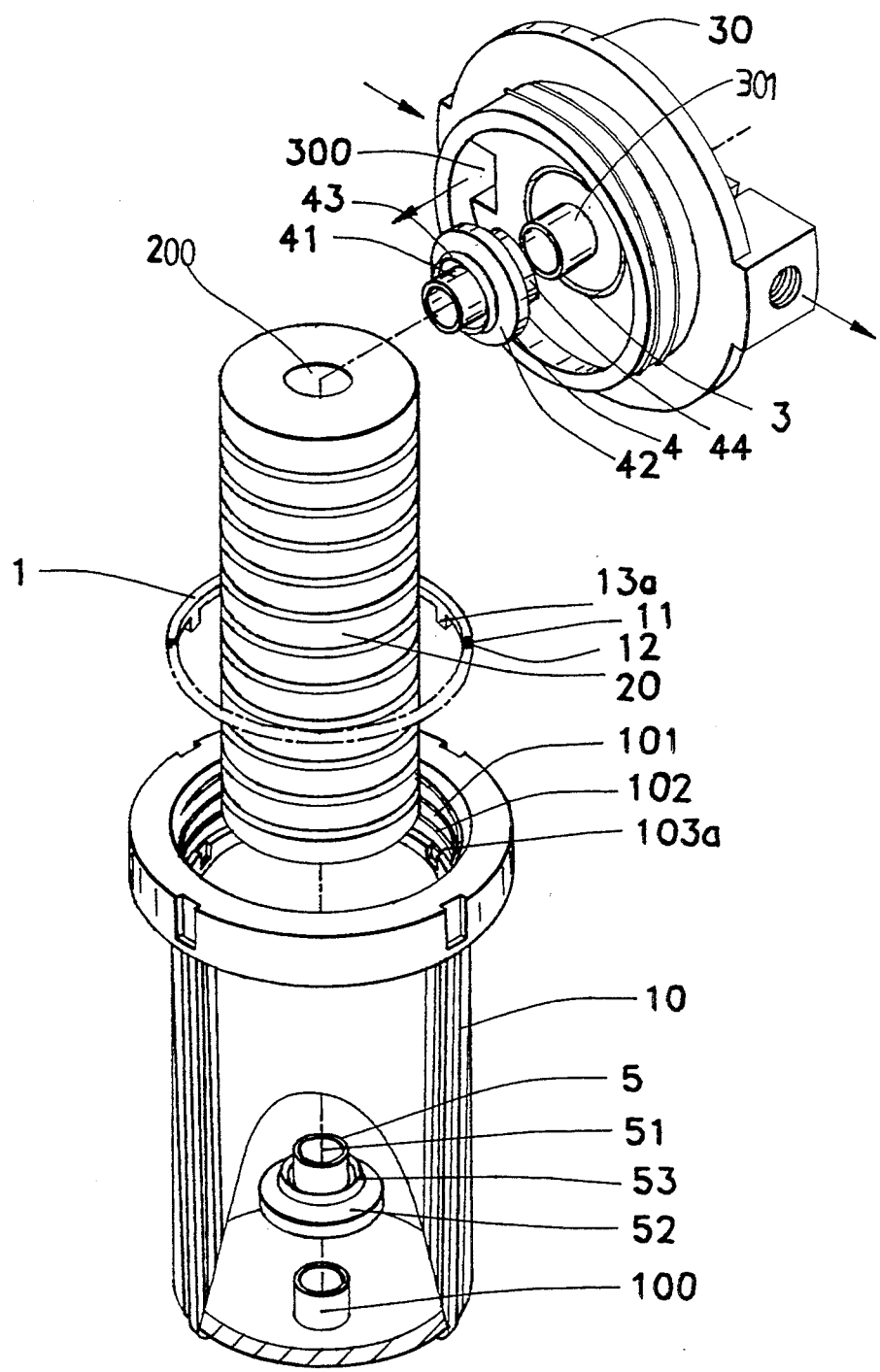
FIG. 5 is an exploded view of a water filter according to the present invention.
Figure 6:
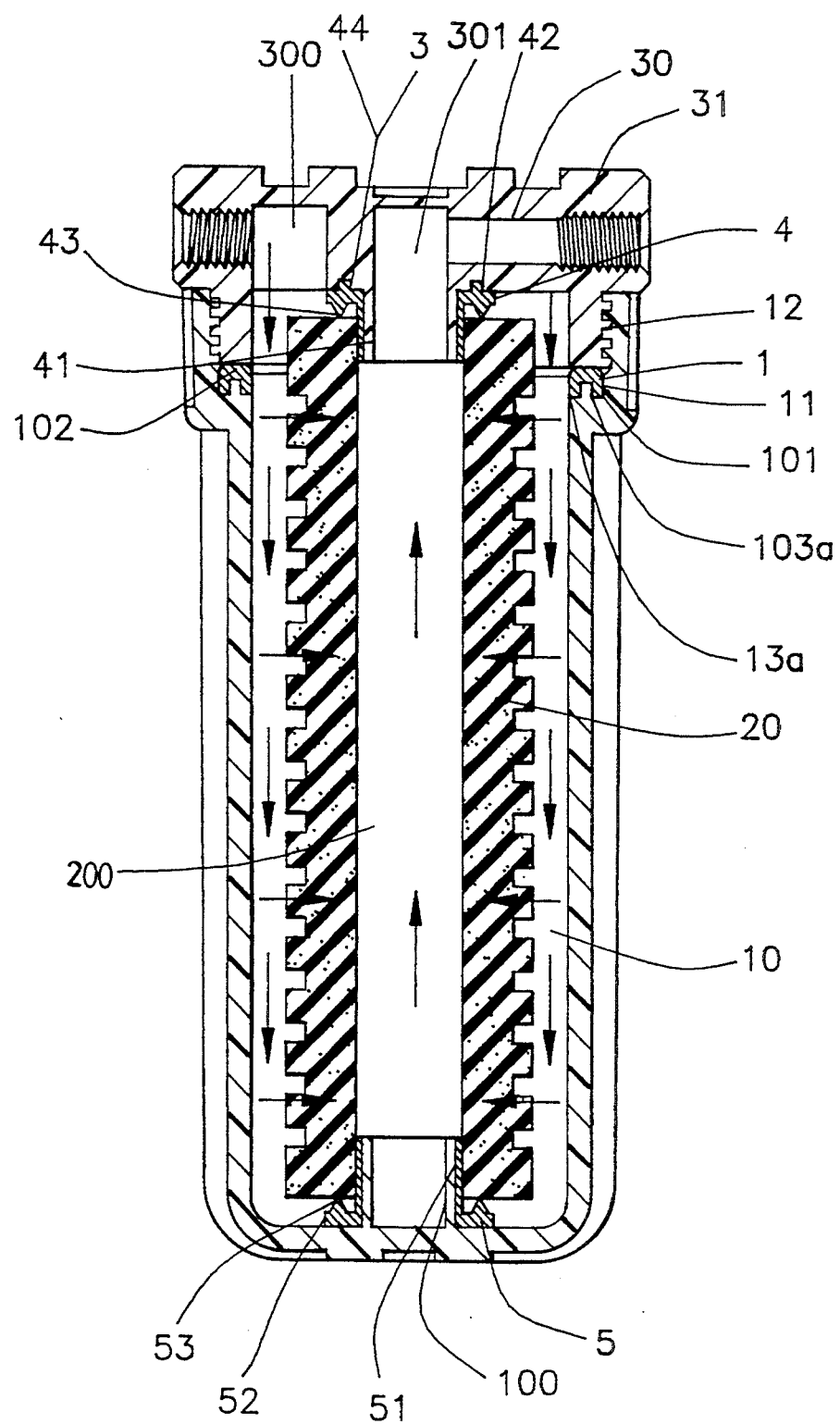
FIG. 6 is an assembly view in section of the water filter shown in FIG. 5.
Figure 8:
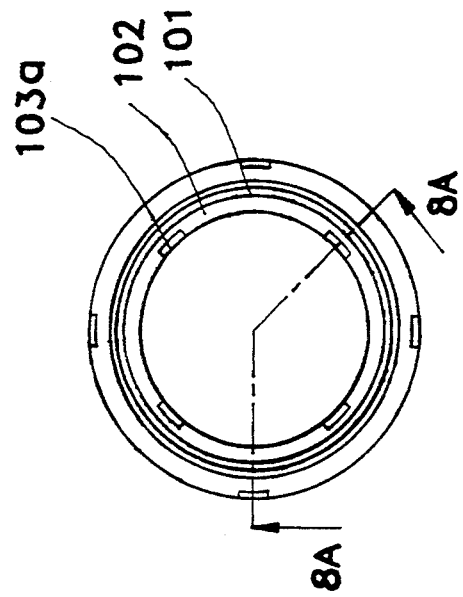
FIG. 8 is a top view of the cylindrical casing shown in FIG. 5.
Figure 8A:
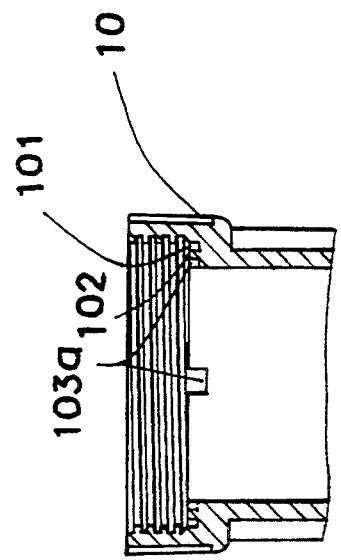
FIG. 8A is a sectional view taken along line 8A—8A of FIG. 8.
Figure 7:
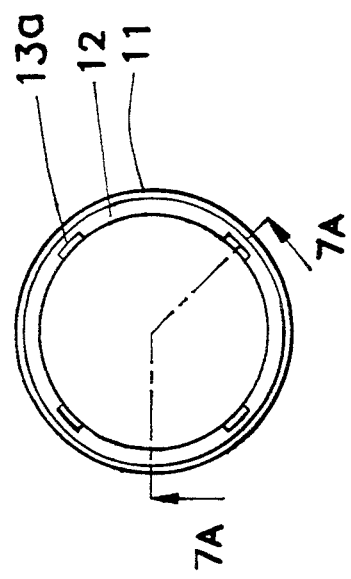
FIG. 7 is bottom view of a packing ring according to the present invention.
Figure 7A:
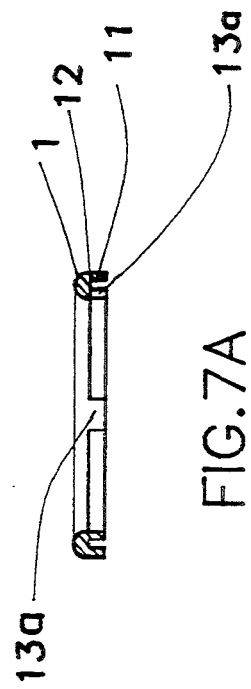
FIG. 7A is a sectional view taken along line 7A—7A of FIG. 7.

Referring to FIGS. 5 and 6, a water filter in accordance with the present invention is generally comprised of a cylindrical casing 10, a filter element 20 received inside the casing 10, a top cover 30 fastened to the cylindrical casing 10 to hold down the filter element 20, and a packing ring 1 sealed between the cylindrical casing 10 and the top cover 30.

Referring to FIGS. 5 through 8, the packing ring 1 is comprised of a longitudinal flange 11 and a horizontal flange 12. The horizontal flange 12 comprises a plurality of downward projecting strips 13a. The cylindrical casing 10 comprises an annular groove 101 around the inside wall near the top opening, an annular stop wall 102 surrounded by the annular groove 101, and a plurality of inside notches 103a spaced around the annular stop wall 102 at a lower elevation. When the packing ring 1 is fastened to the cylindrical casing 10, the longitudinal flange 11 is fitted into the annular groove 101 to form a first sealing line, the horizontal flange 12 is stopped against the annular stop wall 102 to form a second sealing line, and the downward projecting strips 13a are respectively fitted into the inside notches 103a to stop the packing ring 1 from rotary motion relative to the cylindrical casing 10.

Referring to FIGS. 5 and 6, the top cover 30 comprises a water inlet port 300, a water outlet pipe 301, an annular groove 3 at the bottom around the water outlet pipe 301. The cylindrical casing 10 comprises a stub tube 100 on the inside at the bottom. A first water sealing device 4 and a second water sealing device 5 are respectively mounted around the water outlet pipe 301 and the stub tube 100 and sealed between the filter element 20 and the top cover 30/cylindrical casing 10. The water sealing device 4 or 5 comprises a tube 41 or 51, an outward flange 42 or 52 raised around the tube 41 or 51, and an annular flange 43 or 53 raised from the outward flange 42 or 52 at one side around the tube 41 or 51. The first water sealing device 4 further comprises an annular flange 44 raised from the outward flange 42 at an opposite side relative to the annular flange 43. When the tubes 41 and 51 of the first and second water sealing devices 4 and 5 are respectively mounted around the water outlet pipe 301 and the stub tube 100, the annular flange 44 of the first water sealing device 4 is fitted into the annular groove 3 on the top cover 30. After installation, the tubes 41 and 51 are respectively inserted into the two opposite ends of the longitudinal center through hole 200 of the filter element 20, and the annular flanges 43 and 53 of the first and second water sealing devices 4 and 5 are respectively forced into the two opposite ends of the filter element 20 around the longitudinal center through hole 200.

Referring to FIG. 6 again, when water is guided into the water filter through the water inlet port 300, it is forced to move through the filter element 20 into the longitudinal center through hole 200 and then forced out of the water filter through the water outlet pipe 301. Because the two opposite ends of the filter element 20 is properly sealed by the water sealing devices 4 and 5, filtered water does not flow out of the filter element 20 in the reversed direction. Therefore, only filtered clean water is allowed to flow out of the water outlet pipe 301 for use. Furthermore, the installation of the packing ring 1 effectively seals up the gap between the top cover 30 and the cylindrical casing 10.

I claim:

1. A water filter comprising a cylindrical casing having a bottom wall and a top opening, a filter element received inside said cylindrical casing and having a top end, a bottom end and a longitudinal center through hole extending from said top end to said bottom end, a top cover fastened to said cylindrical casing to hold down said filter element, said cover having a water inlet port for guiding water into said cylindrical casing to the filter element and a water outlet for guiding filtered water out of said cylindrical casing from the filter element, said water outlet comprising a water outlet pipe which projects downwardly from the cover into said longitudinal center through hole at said top end of said filter element, said cylindrical casing including a stub pipe extending from said bottom wall upwardly into said longitudinal center through hole at the bottom end of said filter element, a packing ring sealed in an annular groove in said cylindrical casing between said cylindrical casing and said top cover, a first water sealing device sealed between said cylindrical casing and said bottom end of said filter element, and a second water sealing device sealed between said top cover and said top end of said filter element, wherein said packing ring comprises a downwardly extending annular longitudinal flange integrally formed with an annular horizontal flange wherein said horizontal flange includes a plurality of downward projecting strips respectively fitted into a plurality of notches inside said cylindrical casing to stop said packing ring from rotary motion relative to said cylindrical casing; said second water sealing device comprises a tube portion sleeved onto said water outlet pipe of said top cover and having a first tube portion end abutting the top cover and an opposite tube portion end extending into the top end of the longitudinal center through hole of said filter element, said second water seal device further comprising an outward ring flange integrally formed with said first tube portion end and stopped between said top cover and said filter element, and a downwardly extending annular flange raised from the outward ring flange of said second water sealing device and engaging the top end of said filter element; said first water sealing device comprises a tube portion sleeved onto said stub tube inside said cylindrical casing at said bottom wall and having a first tube portion end abutting the bottom wall and an opposite tube portion end extending into the bottom end of the longitudinal center through hole of said filter element, said first water sealing device further comprises an outward ring flange integrally formed with said first tube portion end of said first water seal device and stopped between said bottom wall of said cylindrical casing and said bottom end of the filter element, and an upwardly extending annular flange raised from the outward ring flange of said first water sealing device and engaging the bottom end of said filter element.

2. The water filter of claim 1 wherein said top cover comprises an annular groove at a bottom around said water outlet pipe; said second water sealing device comprises an upwardly extending annular flange raised from the outward ring flange of said of said second water sealing device and fitted into the annular groove on said top cover.

* * * * *